United States Patent
Qian et al.

(10) Patent No.: US 11,314,965 B2
(45) Date of Patent: Apr. 26, 2022

(54) METHOD AND APPARATUS FOR POSITIONING FACE FEATURE POINTS

(71) Applicant: BEIJING SENSETIME TECHNOLOGY DEVELOPMENT CO., LTD., Beijing (CN)

(72) Inventors: Chen Qian, Beijing (CN); Wenyan Wu, Beijing (CN)

(73) Assignee: BEIJING SENSETIME TECHNOLOGY DEVELOPMENT CO., LTD., Beijing (CN)

( * ) Notice: Subject to any disclaimer, the term of this patent is extended or adjusted under 35 U.S.C. 154(b) by 194 days.

(21) Appl. No.: 16/720,124

(22) Filed: Dec. 19, 2019

(65) Prior Publication Data

US 2020/0125833 A1    Apr. 23, 2020

Related U.S. Application Data (63) Continuation of application No. PCT/CN2018/116779, filed on Nov. 21, 2018.

(30) Foreign Application Priority Data

Apr. 24, 2018    (CN) .......................... 201810373871.6

(51) Int. Cl.
     *G06K 9/00*      (2006.01)
     *G06T 7/13*      (2017.01)
     *G06T 5/50*      (2006.01)

(52) U.S. Cl.
     CPC ..... *G06K 9/00255* (2013.01); *G06K 9/00268* (2013.01); *G06T 5/50* (2013.01); *G06T 7/13* (2017.01); *G06T 2207/30201* (2013.01)

(58) Field of Classification Search
CPC .......... G06K 9/00255; G06K 9/00268; G06K 9/00248; G06K 9/4628; G06K 9/6289; G06K 9/00281; G06K 9/00228; G06T 7/13; G06T 5/50; G06T 2207/30201; G06T 2207/20221
See application file for complete search history.

(56) References Cited

U.S. PATENT DOCUMENTS

| | | | |
|---|---|---|---|
| 8,280,173 B2 | 10/2012 | Kato | |
| 8,620,038 B2 * | 12/2013 | Aarabi | ............... G06K 9/00281 382/118 |
| 8,971,589 B2 | 3/2015 | Kato | |

(Continued)

FOREIGN PATENT DOCUMENTS

| | | |
|---|---|---|
| CN | 106156692 A | 11/2016 |
| CN | 106951840 A | 7/2017 |

(Continued)

OTHER PUBLICATIONS

International Search Report in the international application No. PCT/CN2018/116779, dated Feb. 21, 2019.

(Continued)

*Primary Examiner* — Phuoc Tran
(74) *Attorney, Agent, or Firm* — Cooper Legal Group, LLC (57) ABSTRACT

Provided are methods and apparatuses for positioning face feature points. The method includes: carrying out edge detection on a face image to obtain a face feature line image; and fusing the face image and the face feature line image to obtain position information of face feature points.

18 Claims, 10 Drawing Sheets

(56) References Cited

U.S. PATENT DOCUMENTS

| | | | |
|---|---|---|---|
| 9,898,649 B2* | 2/2018 | Wang | G06K 9/00288 |
| 9,916,494 B2 | 3/2018 | Zou et al. | |
| 10,198,624 B2* | 2/2019 | Li | G06K 9/00 |
| 2009/0220157 A1 | 9/2009 | Kato | |
| 2012/0087590 A1 | 4/2012 | Kato | |
| 2016/0283780 A1 | 9/2016 | Zou et al. | |
| 2020/0005060 A1* | 1/2020 | Martin | G05D 1/0223 |

FOREIGN PATENT DOCUMENTS

| | | |
|---|---|---|
| CN | 107832741 A | 3/2018 |
| CN | 108596093 A | 9/2018 |
| JP | 2006011978 A | 1/2006 |
| JP | 2008146356 A | 6/2008 |
| JP | 2009265774 A | 11/2009 |
| KR | 101785661 B1 | 10/2017 |

OTHER PUBLICATIONS

First Office Action of the Chinese application No. 201810373871.6, dated Nov. 29, 2019.
Wayne Wu et al. "Look at Boundary: A Boundary-Aware Face Alignment Algorithm", published on May 26, 2018, https://arxiv.org/abs/1805.10483.
First Office Action of the Japanese application No. 2019-568632, dated Feb. 16, 2021.
First Office Action of the Korean application No. 10-2019-7037564, dated Mar. 26, 2021.
English Translation of the Written Opinion of the International Search Authority in the international application No. PCT/CN2018/116779, dated Feb. 21, 2019.

* cited by examiner

METHOD AND APPARATUS FOR POSITIONING FACE FEATURE POINTS

CROSS-REFERENCE TO RELATED APPLICATION

The present disclosure is a U.S. continuation application of International Application No. PCT/CN2018/116779, filed on Nov. 21, 2018, which claims benefit of Chinese Patent Application No. 201810373871.6, filed with the Chinese Patent Office on Apr. 24, 2018 and entitled "METHODS AND APPARATUSES FOR POSITIONING FACE FEATURE POINTS". The disclosures of these applications are incorporated herein by reference in their entirety.

BACKGROUND

Face feature point positioning is an important class of face-related computer vision problems. The task of face feature point positioning is to calculate positions of a plurality of face feature points in a face image. For example, the positions of the face feature points in the face image, such as the corners of the eyes, the corners of the mouth, and the tip of the nose, are calculated.

SUMMARY

The present disclosure relates to the technical field of computer vision, and in particular to methods and apparatuses for positioning face feature points.

In view of the above, the present disclosure provides methods and apparatuses for positioning face feature points.

A method for positioning face feature points provided according to one aspect of the present disclosure includes:
performing edge detection on a face image to obtain a face feature line image; and
fusing the face image and the face feature line image to obtain position information of face feature points.

An apparatus for positioning face feature points provided according to another aspect of the present disclosure includes:
an edge detection module, configured to perform edge detection on a face image to obtain a face feature line image; and
a fusion module, configured to fuse the face image and the face feature line image to obtain position information of face feature points.

An electronic device provided according to another aspect of the present disclosure includes: a processor; and a memory configured to store processor-executable instructions; where the processor is configured to execute the foregoing method.

A computer-readable storage medium provided according to another aspect of the present disclosure has computer program instructions stored thereon, where when the computer program instructions are executed by a processor, the foregoing method is implemented.

The other features and aspects of the present disclosure can be described more clearly according to the detailed descriptions of the exemplary embodiments in the accompanying drawings.

BRIEF DESCRIPTION OF DRAWINGS

The accompanying drawings included in the specification and constituting a part of the specification illustrate the exemplary embodiments, features, and aspects of the present disclosure together with the specification, and are used for explaining the principles of the present disclosure.

DETAILED DESCRIPTION

The problem of face feature point positioning may be solved through a deep neural network. However, as the number of layers of the deep neural network is increased, the loss of face structure information becomes serious. Under a complex condition that a face in a face image is severely blocked, the face is a side face at a large angle, or an expression of the face is exaggerated, the accuracy of face feature point positioning is greatly reduced.

According to the method and apparatus for positioning face feature points according to various aspects of the present disclosure, by performing edge detection on a face image to obtain a face feature line image, and fusing the face image and the face feature line image to obtain position information of face feature points, positioning of the face feature points is performed by combining a face feature line, and the accuracy of face feature point positioning can be improved. Even if under a complex condition that a face in a face image is blocked, the face is a side face at a large angle, or an expression of the face is exaggerated, positioning of the face feature points can still be performed accurately.

The various exemplary embodiments, features, and aspects of the present disclosure are described below in detail with reference to the accompanying drawings. The same signs in the accompanying drawings represent elements having the same or similar functions. Although the various aspects of the embodiments are illustrated in the accompanying drawings, unless stated particularly, it is not required to draw the accompanying drawings in proportion.

The special word "exemplary" here means "used as examples, embodiments, or descriptions". Any "exemplary"

embodiment given here is not necessarily construed as being superior to or better than other embodiments.

In addition, numerous details are given in the following detailed description for the purpose of better explaining the present disclosure. It should be understood by persons skilled in the art that the present disclosure can still be implemented even without some of those details. In some of the examples, methods, means, elements, and circuits that are well known to persons skilled in the art are not described in detail so that the principle of the present disclosure becomes apparent.

Figure 1:
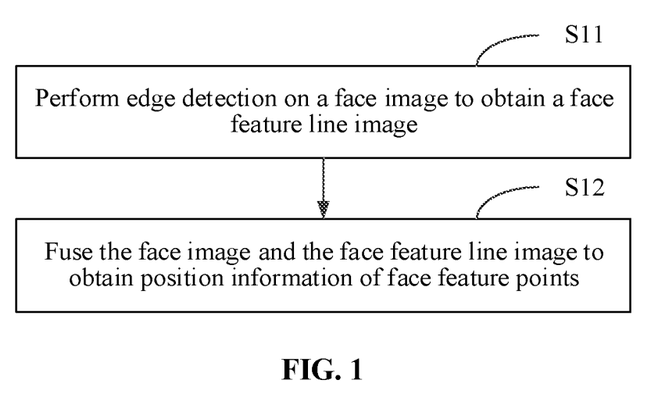
FIG. 1 is a flowchart of a method for positioning face feature points according to one or more embodiments of the present disclosure.

FIG. 1 is a flowchart of a method for positioning face feature points according to one or more embodiments of the present disclosure. As shown in FIG. 1, the method includes operations S11 and S12.

At operation S11, edge detection is performed on a face image to obtain a face feature line image.

In one embodiment, a face image may refer to an image including a face, or a face image may refer to an image for which positioning of face feature points is required.

According to some embodiments of the present disclosure, edge detection may be performed by using a Sobel operator or Canny operator in the related art. No limitation is made thereto here.

In one embodiment, edge detection is performed on a face image through a convolution neural network to obtain a face feature line image.

At operation S12, the face image and the face feature line image are fused to obtain position information of face feature points.

In one embodiment, the face feature points of the face image are precisely positioned based on robust face structure information provided by the face feature line image.

In one embodiment, the face feature points may include one or more of face contour feature points, eyebrow feature points, eye feature points, nose feature points, and lip feature points, where the eye feature points may include eyelid line feature points, the eyelid line feature points may include eye corner feature points, the nose feature points may include nose bridge feature points, and the lip feature points may include lip line feature points.

In one embodiment the face image and the face feature line image are fused through a feature point prediction network to obtain position information of face feature points.

In one or more embodiments of the present disclosure, fusing the face image and the face feature line image may indicate combining information in the face image with information in the face feature line image. For example, it may be indicated that pixels and/or features in the face image and pixels and/or features in the face feature line image are combined in a certain way.

According to one embodiment, by performing edge detection on a face image to obtain a face feature line image, and fusing the face image and the face feature line image to obtain position information of face feature points, positioning of the face feature points is performed by combining a face feature line, and the accuracy of face feature point positioning can be improved. Even if under a complex condition that a face in a face image is blocked, the face is a side face at a large angle, or an expression of the face is exaggerated, positioning of the face feature points can still be performed accurately.

Figure 2:
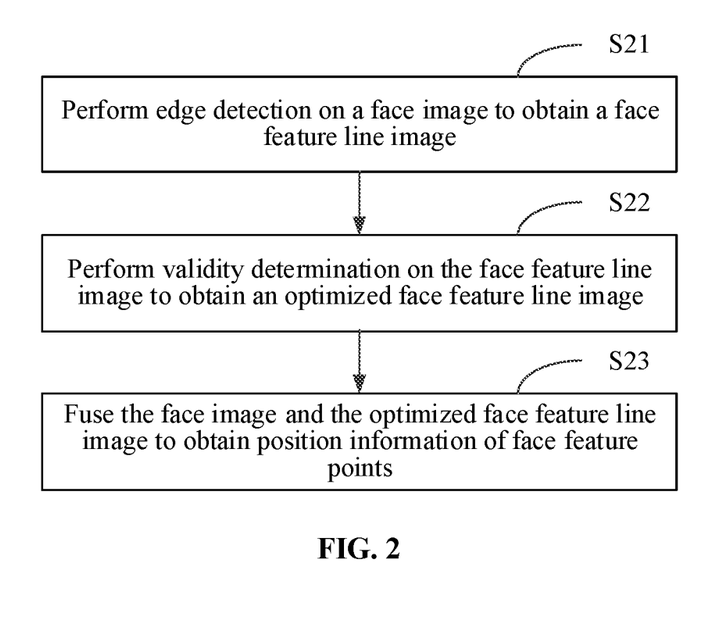
FIG. 2 is an exemplary flowchart of a method for positioning face feature points according to one or more embodiments of the present disclosure.

FIG. 2 is an exemplary flowchart of a method for positioning face feature points according to one or more embodiments of the present disclosure. As shown in FIG. 2, the method may include operations S21 to S23.

At operation S21, edge detection is performed on a face image to obtain a face feature line image.

For operation S21, please refer to the description of operation S11 above.

At operation S22, validity determination is performed on the face feature line image to obtain an optimized face feature line image.

In one embodiment, validity determination is performed on the face feature line image by using a convolution neural network based on an adversarial generation model to obtain an optimized face feature line image. In this implementation, a determination model in the adversarial generation model may be used for performing validity determination on the face feature line image, namely, the determination model may be used for determining whether the face feature line image is valid; and a generation model in the adversarial generation model may be used for generating an optimized face feature line image.

At operation S23, the face image and the optimized face feature line image are fused to obtain position information of face feature points.

In one embodiment, a detection result of the face feature line image has a great influence on the accuracy of final face feature point positioning. Therefore, by performing validity determination on the face feature line image to obtain an optimized face feature line image, and fusing the face image and the optimized face feature line image to obtain position information of face feature points, the quality of the face feature line image can be greatly improved, and thus the accuracy of face feature point positioning can be further improved.

Figure 3:
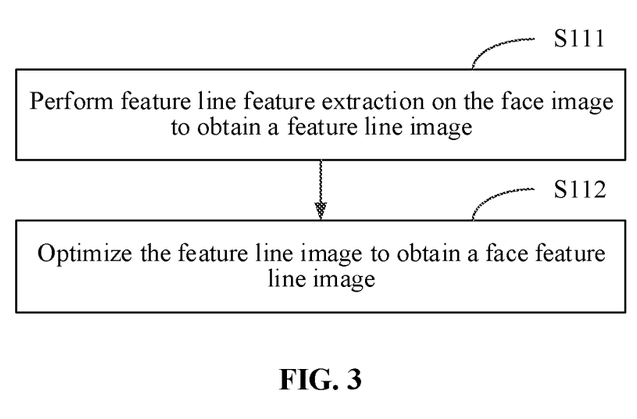
FIG. 3 is an exemplary flowchart of operation S11 of a method for positioning face feature points according to one or more embodiments of the present disclosure.

FIG. 3 is an exemplary flowchart of operation S11 of a method for positioning face feature points according to one or more embodiments of the present disclosure. As shown in FIG. 3, operation S11 may include operations S111 and S112.

At operation S111, feature line feature extraction is performed on the face image to obtain a feature line image.

In one embodiment, the feature line may include one or more of a face contour feature line, a left eyebrow feature line, a right eyebrow feature line, a nose bridge feature line, a left eye upper eyelid feature line, a left eye lower eyelid feature line, a right eye upper eyelid feature line, a right eye lower eyelid feature line, an upper lip upper edge feature line, an upper lip lower edge feature line, a lower lip upper edge feature line, and a lower lip lower edge feature line.

In one embodiment, feature line feature extraction is performed on the face image by using a convolutional neural network to obtain a feature line image. For example, feature line feature extraction is performed on the face image by using ResNet18 to obtain a feature line image.

In one possible embodiment, the performing feature line feature extraction on the face image to obtain a feature line image includes: sequentially performing convolution, a residual operation, downsampling, and a residual operation on the face image to obtain the feature line image.

At operation S112, the feature line image is optimized to obtain a face feature line image.

In one embodiment, the optimizing the feature line image to obtain a face feature line image includes: optimizing the feature line image by at least one stage of optimization network to obtain the face feature line image, where each stage of optimization network includes a hourglass-shaped network used for realizing a residual operation and an information transmission layer used for realizing feature line information transmission. For example, if a one stage of optimization network is included, the feature line image is optimized through the hourglass-shaped network and the information transmission layer sequentially to obtain the face feature line image; and if two stages of optimization networks are included, the feature line image is optimized through a first hourglass-shaped network, a first information transmission layer, a second hourglass-shaped network, and a second information transmission layer sequentially to obtain the face feature line image. In other embodiments, if three and more stages of optimization networks are included, the feature line image is optimized in the same manner above.

Figure 4:
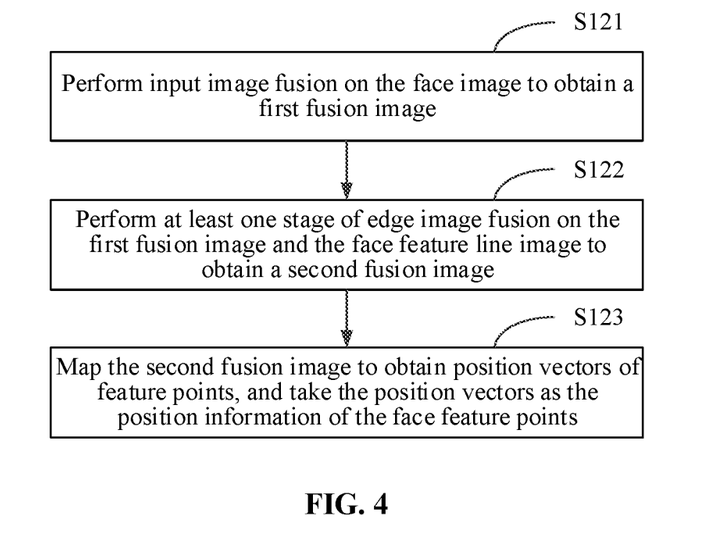
FIG. 4 is an exemplary flowchart of operation S12 of a method for positioning face feature points according to one or more embodiments of the present disclosure.

FIG. 4 is an exemplary flowchart of operation S12 of a method for positioning face feature points according to one or more embodiments of the present disclosure. As shown in FIG. 4, operation S12 may include operations S121 to S123.

At operation S121, input image fusion is performed on the face image to obtain a first fusion image.

In one embodiment, the first fusion image may reflect a boundary feature of each feature line in the face image.

At operation S122, at least one stage of edge image fusion is performed on the first fusion image and the face feature line image to obtain a second fusion image.

At operation S123, the second fusion image is mapped to obtain position vectors of feature points, and the position vectors are taken as the position information of the face feature points.

In one embodiment, the mapping the second fusion image to obtain position vectors of feature points includes: sequentially performing a residual operation and a full-connection operation on the second fusion image to obtain position vectors of the feature points.

In one embodiment, before performing at least one stage of edge image fusion on the first fusion image and the face feature line image, further included is: performing optimization processing on the first fusion image to obtain an optimized first fusion image, where the optimization processing sequentially includes convolution, downsampling, and a residual operation.

In one embodiment, between each stage of edge image fusion, further included is: performing a residual operation on a result of each stage of edge fusion.

Figure 5:
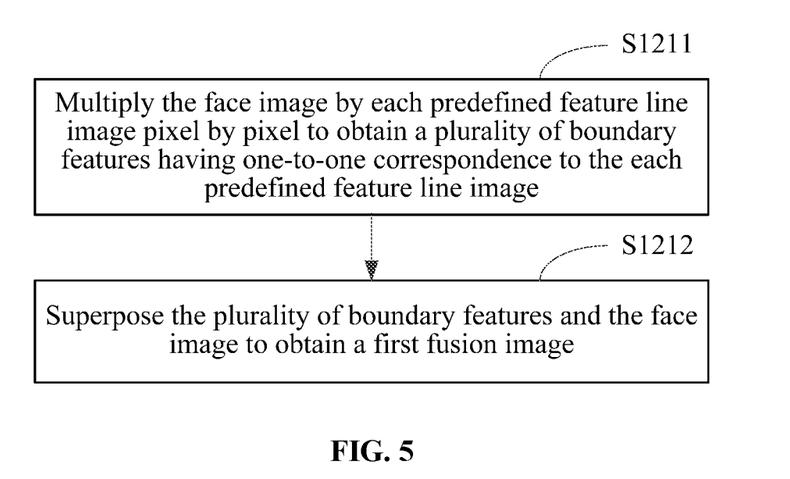
FIG. 5 is an exemplary flowchart of operation S121 of a method for positioning face feature points according to one or more embodiments of the present disclosure.

FIG. 5 is an exemplary flowchart of operation S121 of a method for positioning face feature points according to one or more embodiments of the present disclosure. As shown in FIG. 5, operation S121 may include operations S1211 and S1212.

At operation S1211, the face image is multiplied by each predefined feature line image pixel by pixel to obtain a plurality of boundary features having one-to-one correspondence to the each predefined feature line image.

At operation S1212, the plurality of boundary features and the face image are superposed to obtain a first fusion image.

In one embodiment, the first fusion image F may be obtained by using formula 1.

$$F = I \oplus (M_1 \otimes I) \oplus \ldots \oplus (M_i \otimes I) \ldots \oplus (M_K \otimes I) \quad \text{Formula 1}$$

I represents the face image, $M_i$ represents the i th predefined feature line image, and K represents the number of predefined feature line images. $M_i \otimes I$ represents multiplying $M_i$ by I pixel by pixel, and $\oplus$ represents a superposition operation.

According to the implementation, by multiplying the face image by each predefined feature line image pixel by pixel to obtain a plurality of boundary features having one-to-one correspondence to the each predefined feature line image, and superposing the plurality of boundary features and the face image to obtain a first fusion image, for the obtained first fusion image, only the part having a rich structure and the feature part in the face image are concerned and the background part and the part having no rich structure in the face image are ignored. Therefore, the validity of the first fusion image as input of a subsequent network can be greatly improved. According to the implementation, an original face image is also considered, so that subsequent feature point prediction can be performed by using valuable information in the face image.

In one embodiment, the method further includes: for any training image in a training image set, annotating face feature points in the training image; interpolating the face feature points in the training image to obtain face feature line information in the training image; and according to each training image in the training image set and the face feature line information in the each training image, training a convolution neural network used for obtaining a predefined feature line image. In this implementation, the training image set may include a plurality of training images, and 106 face feature points may be annotated separately in each training image. In this implementation, interpolation may be performed between adjacent face feature points in the training image to obtain a curve, and the curve obtained by the interpolation may serve as a face feature line in the training image. According to the implementation, by annotating, for any training image in a training image set, face feature points in the training image, interpolating the face feature points in the training image to obtain face feature line information in the training image, and according to each training image in the training image set and the face feature line information in the each training image, training a convolution neural network used for obtaining a predefined feature line image, the annotated face feature points are interpolated to obtain a face feature line for supervising training of a convolution neural network for obtaining a predefined feature line image.

Figure 6:
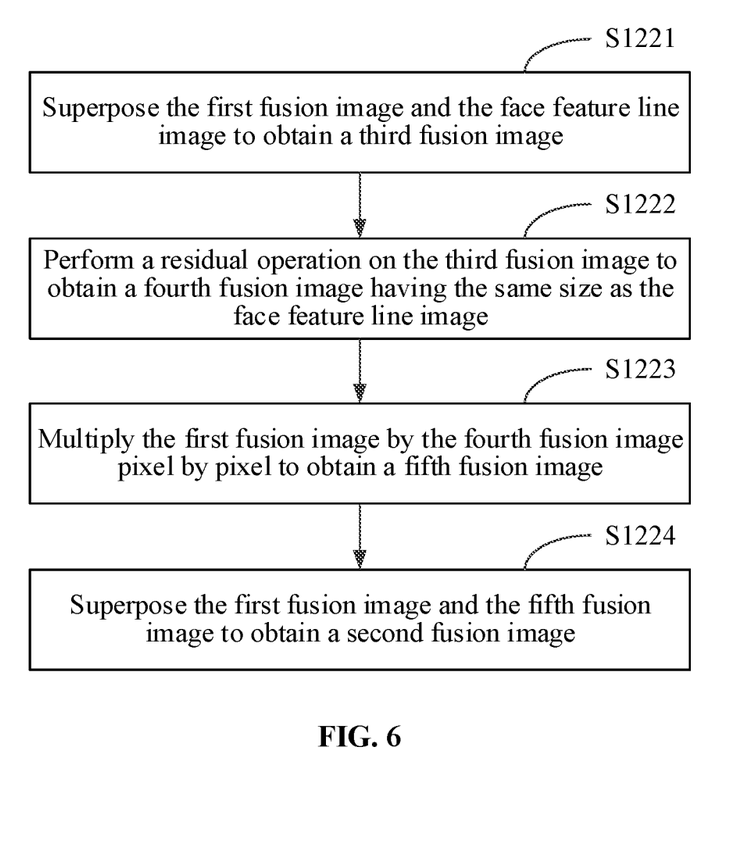
FIG. 6 is an exemplary flowchart of operation S122 of a method for positioning face feature points according to one or more embodiments of the present disclosure.

FIG. 6 is an exemplary flowchart of operation S122 of a method for positioning face feature points according to one or more embodiments of the present disclosure. As shown in FIG. 6, operation S122 may include operations S1221 to S1224.

At operation S1221, the first fusion image and the face feature line image are superposed to obtain a third fusion image.

At operation S1222, a residual operation is performed on the third fusion image to obtain a fourth fusion image having the same size as the face feature line image.

At operation S1223, the first fusion image is multiplied by the fourth fusion image pixel by pixel to obtain a fifth fusion image.

At operation S1224, the first fusion image and the fifth fusion image are superposed to obtain a second fusion image.

In one embodiment, the second fusion image H may be obtained by using formula 2.

$$H = F \oplus (F \otimes T(M \oplus F)) \quad \text{Formula 2}$$

F represents the first fusion image, M represents the face feature line image, $M \oplus F$ represents superposing the first fusion image and the face feature line image, and $M \oplus F$ represents the third fusion image. $T(M \oplus F)$ represents performing a residual operation on the third fusion image, and represents the fourth fusion image. In one embodiment, because the number of channels of the face feature line image M is determined according to the number of predefined feature lines, a conversion structure T is required to enable the number of channels of the face feature line image M to be the same as that of the first fusion image F. The conversion structure T may use a hourglass-shaped network. F⊗T(M⊕F) represents multiplying first fusion image F by the fourth fusion image pixel by pixel, and F⊗T(M⊕F) represents the fifth fusion image. F⊕(F⊗T(M⊕F)) represents superposing the first fusion image F and the fifth fusion image F⊗T(M⊕F).

In one embodiment, the method further includes: by taking each training image in the training image set and the face feature line information in the each training image as input of a feature point prediction network, and taking position information of face feature points in the each training image as output of the feature point prediction network, training the feature point prediction network, where the number of face feature points in the each training image may be 106. According to the implementation, by taking each training image in the training image set and the face feature line information in the each training image as input of a feature point prediction network, and taking position information of face feature points in the each training image as output of the feature point prediction network, the feature point prediction network is trained, thus the face feature line information is fused, and supervised training is performed by using the face feature points in the face image. Because the trained feature point prediction network fuses the face feature line information, a positioning result of face feature points with higher precision may be obtained.

Figure 7:
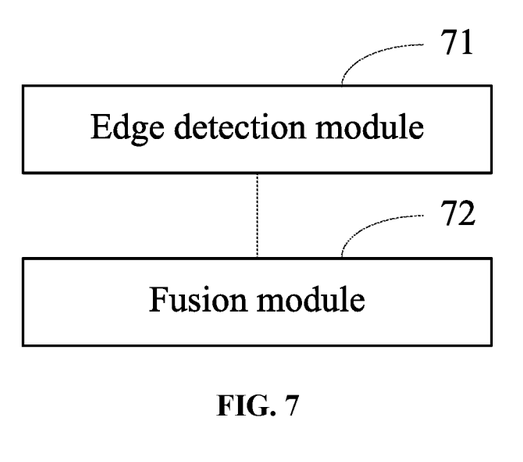
FIG. 7 is a block diagram of an apparatus for positioning face feature points according to one or more embodiments of the present disclosure.

FIG. 7 is a block diagram of an apparatus for positioning face feature points according to one embodiment of the present disclosure. As shown in FIG. 7, the apparatus includes: an edge detection module 71, configured to perform edge detection on a face image to obtain a face feature line image; and a fusion module 72, configured to fuse the face image and the face feature line image to obtain position information of face feature points.

Figure 8:
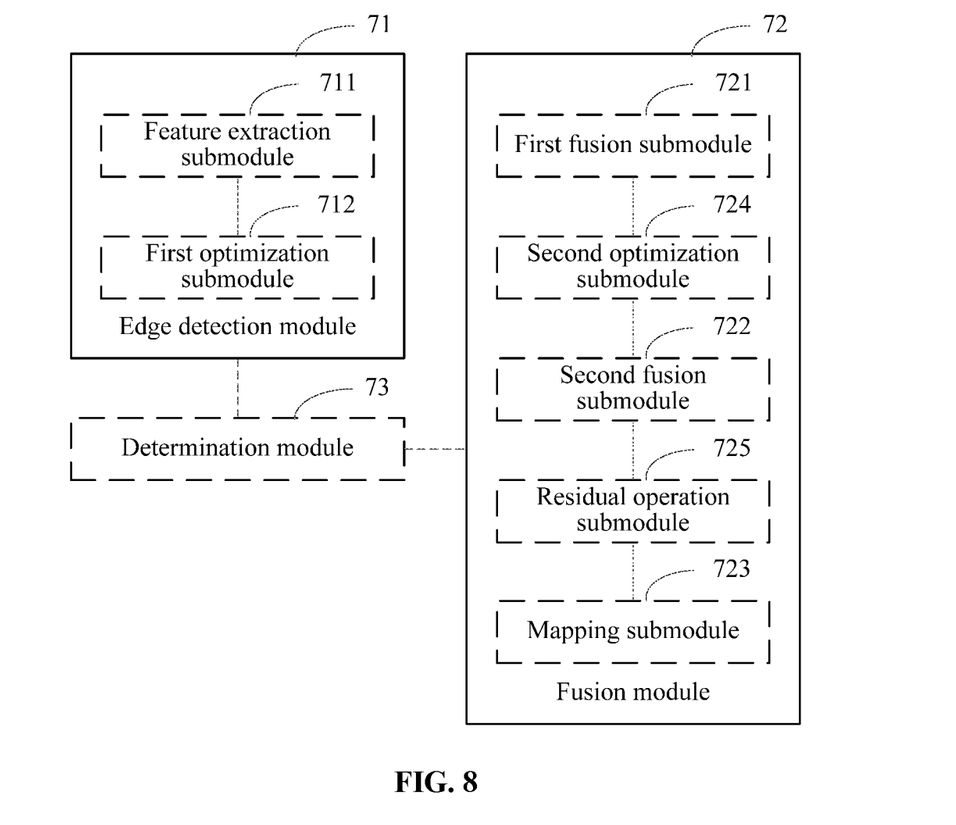
FIG. 8 is an exemplary block diagram of an apparatus for positioning face feature points according to one or more embodiments of the present disclosure.

FIG. 8 is an exemplary block diagram of an apparatus for positioning face feature points according to one or more embodiments of the present disclosure. As shown in FIG. 8:

In one embodiment, the apparatus further includes: a determination module 73, configured to perform validity determination on the face feature line image to obtain an optimized face feature line image; and a fusion module 72, configured to fuse the face image and the optimized face feature line image to obtain position information of face feature points.

In one embodiment, the edge detection module 71 includes: a feature extraction submodule 711, configured to perform feature line feature extraction on the face image to obtain a feature line image; and a first optimization submodule 712, configured to optimize the feature line image to obtain the face feature line image.

In one embodiment, the feature extraction submodule 711 is configured to: sequentially perform convolution, a residual operation, downsampling, and a residual operation on the face image to obtain the feature line image.

In one embodiment, the first optimization submodule 712 is configured to: optimize the feature line image by at least one stage of optimization network to obtain the face feature line image, wherein each stage of optimization network includes a hourglass-shaped network used for realizing a residual operation and an information transmission layer used for realizing feature line information transmission.

In one embodiment, the fusion module 72 includes: a first fusion submodule 721, configured to perform input image fusion on the face image to obtain a first fusion image; a second fusion submodule 722, configured to perform at least one stage of edge image fusion on the first fusion image and the face feature line image to obtain a second fusion image; and a mapping submodule 723, configured to map the second fusion image to obtain position vectors of feature points, and take the position vectors as the position information of the face feature points.

In one embodiment, the fusion module 72 further includes: a second optimization submodule 724, configured to performing optimization processing on the first fusion image to obtain an optimized first fusion image, where the optimization processing sequentially includes convolution, downsampling, and a residual operation.

In one embodiment, the first fusion submodule 721 includes: a first multiplication unit, configured to multiply the face image by each predefined feature line image pixel by pixel to obtain a plurality of boundary features having one-to-one correspondence to the each predefined feature line image; and a first superposition unit, configured to superpose the plurality of boundary features and the face image to obtain a first fusion image.

In one embodiment, the second fusion submodule 722 includes: a second superposition unit, configured to superpose the first fusion image and the face feature line image to obtain a third fusion image; a residual operation unit, configured to perform a residual operation on the third fusion image to obtain a fourth fusion image having the same size as the face feature line image; a second multiplication unit, configured to multiply the first fusion image by the fourth fusion image pixel by pixel to obtain a fifth fusion image; and a third superposition unit, configured to superpose the first fusion image and the fifth fusion image to obtain a second fusion image.

In one embodiment, the fusion module 72 further includes: a residual operation submodule 725, configured to perform a residual operation on a result of each stage of edge fusion.

In one embodiment the mapping submodule 723 is configured to: sequentially perform a residual operation and a full-connection operation on the second fusion image to obtain position vectors of feature points.

According to one embodiment, by performing edge detection on a face image to obtain a face feature line image, and fusing the face image and the face feature line image to obtain position information of face feature points, positioning of the face feature points is performed by combining a face feature line, and the accuracy of face feature point positioning can be improved. Even if under a complex condition that a face in a face image is blocked, the face is a side face at a large angle, or an expression of the face is exaggerated, positioning of the face feature points can still be performed accurately.

Figure 9:
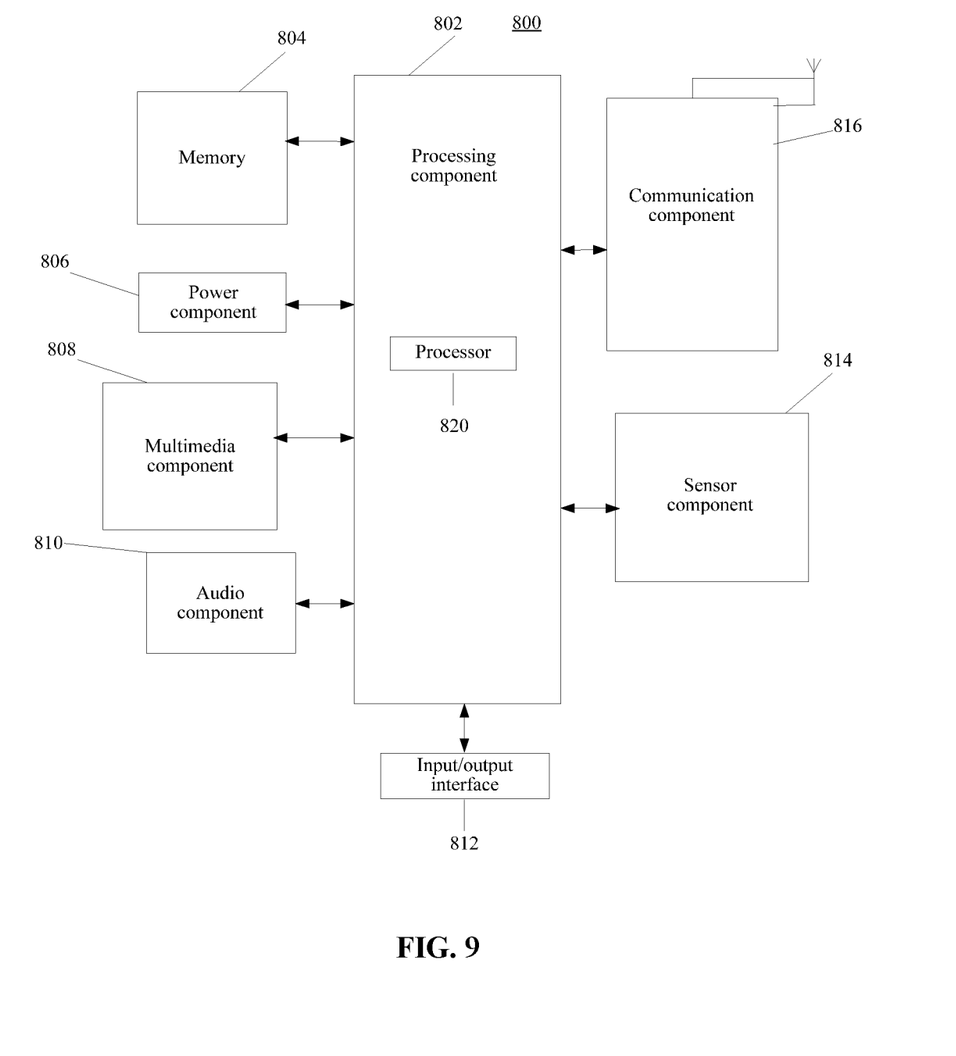
FIG. 9 is a block diagram of an apparatus 800 for positioning face feature points according to one or more exemplary embodiments.

FIG. 9 is a block diagram of an apparatus 800 for positioning face feature points according to one or more exemplary embodiments. For example, the apparatus 800 may be a mobile phone, a computer, a digital broadcast terminal, a message transceiving device, a game console, a tablet device, a medical device, exercise equipment, a personal digital assistant, etc.

With reference to FIG. 9, the apparatus 800 may include one or more of the following components: a processing component 802, a memory 804, a power component 806, a multimedia component 808, an audio component 810, an Input/Output (I/O) interface 812, a sensor component 814, and a communication component 816.

The processing component 802 generally controls overall operation of the apparatus 800, such as operations associated with display, phone calls, data communications, camera operations, and recording operations. The processing component 802 may include one or more processors 820 to execute instructions to implement all or some of the operations of the method above. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations in the apparatus 800. Examples of the data include instructions for any application or method operated on the apparatus 800, contact data, contact list data, messages, pictures, videos, and etc. The memory 804 may be implemented by any type of volatile or non-volatile storage device, or a combination thereof, such as a Static Random-Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or an optical disk.

The power component 806 provides power for various components of the apparatus 800. The power component 806 may include a power management system, one or more power supplies, and other components associated with power generation, management, and distribution for the apparatus 800.

The multimedia component 808 includes a screen between the apparatus 800 and a user that provides an output interface. In some embodiments, the screen may include a Liquid Crystal Display (LCD) and a Touch Panel (TP). If the screen includes a TP, the screen may be implemented as a touch screen to receive input signals from the user. The TP includes one or more touch sensors for sensing touches, swipes, and gestures on the TP. The touch sensor may not only sense the boundary of a touch or swipe action, but also detect the duration and pressure related to the touch or swipe operation. In some embodiments, the multimedia component 808 includes a front-facing camera and/or a rear-facing camera. When the apparatus 800 is in an operation mode, for example, a photography mode or a video mode, the front-facing camera and/or the rear-facing camera may receive external multimedia data. Each of the front-facing camera and the rear-facing camera may be a fixed optical lens system, or have focal length and optical zoom capabilities.

The audio component 810 is configured to output and/or input an audio signal. For example, the audio component 810 includes a microphone (MIC), and the microphone is configured to receive an external audio signal when the apparatus 800 is in an operation mode, such as a calling mode, a recording mode, and a voice recognition mode. The received audio signal may be further stored in the memory 804 or transmitted by means of the communication component 816. In some embodiments, the audio component 810 further includes a speaker for outputting the audio signal.

The I/O interface 812 provides an interface between the processing component 802 and a peripheral interface module, which may be a keyboard, a click wheel, a button, etc. The button may include, but is not limited to, a home button, a volume button, a start button, and a lock button.

The sensor component 814 includes one or more sensors for providing state assessment in various aspects for the apparatus 800. For example, the sensor component 814 may detect an on/off state of the apparatus 800, and relative positioning of components, which are the display and keypad of the apparatus 800, for example, and the sensor component 814 may further detect a position change of the apparatus 800 or a component of the apparatus 800, the presence or absence of contact of the user with the apparatus 800, the orientation or acceleration/deceleration of the apparatus 800, and a temperature change of the apparatus 800. The sensor component 814 may include a proximity sensor, which is configured to detect the presence of a nearby object when there is no physical contact. The sensor component 814 may further include a light sensor, such as a CMOS or CCD image sensor, for use in an imaging application. In some embodiments, the sensor component 814 may further include an acceleration sensor, a gyroscope sensor, a magnetic sensor, a pressure sensor, or a temperature sensor.

The communication component 816 is configured to facilitate wired or wireless communications between the apparatus 800 and other devices. The apparatus 800 may access a wireless network based on a communication standard, such as WiFi, 2G, or 3G, or a combination thereof. In one exemplary embodiment, the communication component 816 receives a broadcast signal or broadcast-related information from an external broadcast management system by means of a broadcast channel In one exemplary embodiment, the communication component 816 further includes a Near Field Communication (NFC) module to facilitate short-range communication. For example, the NFC module may be implemented based on Radio Frequency Identification (RFID) technology, Infrared Data Association (IrDA) technology, Ultra-Wideband (UWB) technology, Bluetooth (BT) technology, and other technologies.

In an exemplary embodiment, the apparatus 800 may be implemented by one or more Application-Specific Integrated Circuits (ASICs), Digital Signal Processors (DSPs), Digital Signal Processing Devices (DSPDs), Programmable Logic Devices (PLDs), Field-Programmable Gate Arrays (FPGAs), controllers, microcontrollers, microprocessors, or other electronic elements, to execute the method above.

In an exemplary embodiment, a non-volatile computer-readable storage medium is further provided, for example, a memory 804 including computer program instructions, which can executed by the processor 820 of the apparatus 800 to implement the method above.

Figure 10:
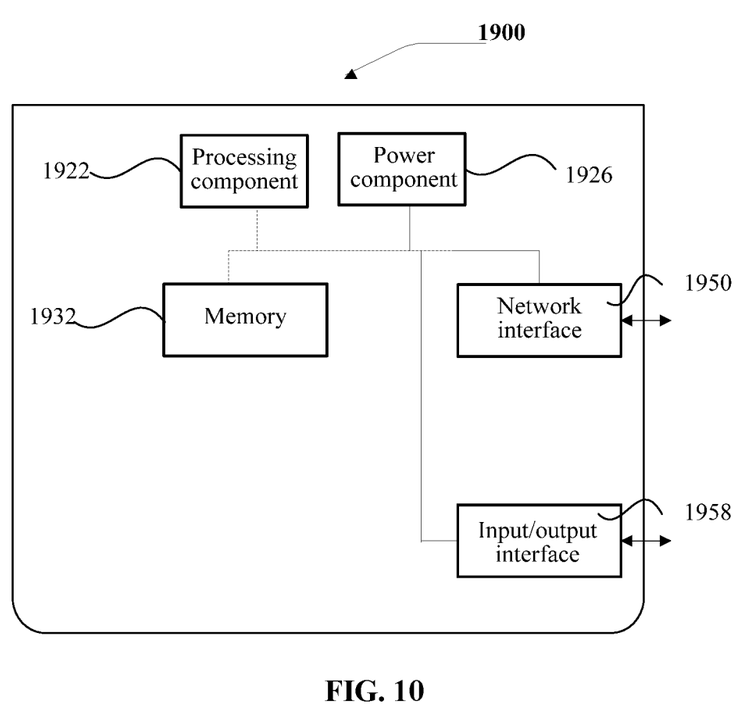
FIG. 10 is a block diagram of an apparatus 1900 for positioning face feature points according to one or more exemplary embodiments.

FIG. 10 is a block diagram of an apparatus 1900 for positioning face feature points according to one or more exemplary embodiments. For example, the apparatus 1900 may be provided as a server. With reference to FIG. 10, the apparatus 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. Further, the processing component 1922 may be configured to execute instructions so as to execute the method above.

The apparatus 1900 may further include a power component 1926 configured to execute power management of the apparatus 1900, a wired or wireless network interface 1950 configured to connect the apparatus 1900 to the network, and an I/O interface 1958. The apparatus 1900 may be operated based on an operating system stored in the memory 1932, such as Windows Server™, Mac OS X™, Unix™, Linux™, FreeBSD™ or the like.

In an exemplary embodiment, a non-volatile computer-readable storage medium is further provided, for example, a memory 1932 including computer program instructions, which can be executed by the processor 1922 of the apparatus 1900 to implement the method above.

The present disclosure may be a system, a method, and/or a computer program product. The computer program product may include a computer-readable storage medium having computer-readable program instructions thereon for causing a processor to implement the aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the computer-readable storage medium include: a portable computer diskette, a hard disk, an RAM, an ROM, an EPROM or Flash memory, an SRAM, a portable Compact Disk Read-Only Memory (CD-ROM), a Digital Versatile Disc (DVD), a memory stick, a floppy disk, a mechanically encoded device such as punch-cards or raised structure in a groove having instructions stored thereon, and any suitable combination of the foregoing. The computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer-readable program instructions described herein can be downloaded to respective computing/processing devices from a computer-readable storage medium or to an external computer or external storage device via a network, for example, the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer program instructions for performing operations of the present disclosure may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In a scenario involving a remote computer, the remote computer may be connected to the user's computer through any type of network, including a Local Area Network (LAN) or a Wide Area Network (WAN), or the connection may be made to an external computer (for example, through the Internet using an Internet service provider). In some embodiments, electronic circuitry including, for example, programmable logic circuitry, FPGAs, or Programmable Logic Arrays (PLAs) may execute the computer-readable program instructions by utilizing state information of the computer-readable program instructions to personalize the electronic circuitry, in order to implement the aspects of the present disclosure.

The aspects of the present disclosure are described herein with reference to flowcharts and/or block diagrams of methods, apparatuses (systems), and computer program products according to the embodiments of the present disclosure. It should be understood that each block of the flowcharts and/or block diagrams, and combinations of the blocks in the flowcharts and/or block diagrams can be implemented by computer-readable program instructions.

These computer-readable program instructions may be provided to a processor of a general-purpose computer, special-purpose computer, or other programmable data processing apparatus to produce a machine, such that the instructions, which are executed via the processor of the computer or other programmable data processing apparatus, create means for implement the functions/acts specified in one or more blocks of the flowcharts and/or block diagrams. These computer-readable program instructions may also be stored in a computer-readable storage medium that can cause a computer, a programmable data processing apparatus, and/or other devices to function in a particular manner, such that the computer-readable medium having instructions stored therein includes an article of manufacture including instructions which implement the aspects of the functions/acts specified in one or more blocks of the flowcharts and/or block diagrams.

The computer-readable program instructions may also be loaded onto a computer, other programmable data processing apparatus, or other device to cause a series of operational operations to be performed on the computer, other programmable apparatus or other device to produce a computer implemented process, such that the instructions which execute on the computer, other programmable apparatus or other device implement the functions/acts specified in one or more blocks of the flowcharts and/or block diagrams.

The flowcharts and block diagrams in the accompanying drawings illustrate the architecture, functionality, and operations of embodiments of systems, methods, and computer program products according to multiple embodiments of the present disclosure. In this regard, each block in the flowcharts or block diagrams may represent a module, program segment, or a portion of instruction, which includes one or more executable instructions for implementing the specified logical function(s). In some alternative implementations, the functions noted in the block may also occur out of the order noted in the accompanying drawings. For example, two blocks shown in succession may, in fact, be executed substantially concurrently, or the blocks may sometimes be executed in the reverse order, depending upon the functionality involved. It should also be noted that each block of the block diagrams and/or flowcharts, and combinations of blocks in the block diagrams and/or flowcharts, may be implemented by special purpose hardware-based systems that perform the specified functions or acts or performed by combinations of special purpose hardware and computer instructions.

The descriptions of the embodiments of the present disclosure have been presented for purposes of illustration, but are not intended to be exhaustive or limited to the embodiments disclosed. Many modifications and variations will be apparent to a person of ordinary skill in the art without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

The invention claimed is:

1. A method for positioning face feature points, comprising:
   performing edge detection on a face image to obtain a face feature line image; and
   fusing the face image and the face feature line image to obtain position information of face feature points,
   wherein the fusing the face image and the face feature line image to obtain position information of face feature points comprises:
   performing input image fusion on the face image to obtain a first fusion image;
   performing at least one stage of ed e image fusion on the first fusion image and the face feature line image to obtain a second fusion image; and
   mapping the second fusion image to obtain position vectors of feature points, and taking the position vectors as the position information of the face feature points.

2. The method according to claim 1, before the fusing the face image and the face feature line image, further comprising:
   performing validity determination on the face feature line image to obtain an optimized face feature line image; and
   the fusing the face image and the face feature line image to obtain position information of face feature points comprising:
   fusing the face image and the optimized face feature line image to obtain the position information of the face feature points.

3. The method according to claim 1, wherein the performing edge detection on a face image to obtain a face feature line image comprises:
   performing feature line feature extraction on the face image to obtain a feature line image; and
   optimizing the feature line image to obtain the face feature line image.

4. The method according to claim 3, wherein the performing feature line feature extraction on the face image to obtain a feature line image comprises:
   sequentially performing a convolution operation, a residual operation, a downsampling operation, and another residual operation on the face image to obtain the feature line image.

5. The method according to claim 3, wherein the optimizing the feature line image to obtain the face feature line image comprises:
   optimizing the feature line image by at least one stage of optimization network to obtain the face feature line image, wherein each stage of the optimization network comprises a hourglass-shaped network used for realizing a residual operation and an information transmission layer used for realizing feature line information transmission.

6. The method according to claim 1, before performing at least one stage of edge image fusion on the first fusion image and the face feature line image, further comprising:
   performing optimization processing on the first fusion image to obtain an optimized first fusion image, wherein the optimization processing sequentially comprises a convolution operation, a downsampling operation, and a residual operation.

7. The method according to claim 1, wherein the performing input image fusion on the face image to obtain a first fusion image comprises:
   multiplying the face image by each predefined feature line image pixel by pixel to obtain a plurality of boundary features having one-to-one correspondence to the each predefined feature line image; and
   superposing the plurality of boundary features and the face image to obtain the first fusion image.

8. The method according to claim 1, wherein the performing at least one stage of edge image fusion on the first fusion image and the face feature line image to obtain a second fusion image comprises:
   superposing the first fusion image and the face feature line image to obtain a third fusion image;
   performing a residual operation on the third fusion image to obtain a fourth fusion image having a same size as the face feature line image;
   multiplying the first fusion image by the fourth fusion image pixel by pixel to obtain a fifth fusion image; and
   superposing the first fusion image and the fifth fusion image to obtain the second fusion image.

9. The method according to claim 1, among each stage of edge image fusion, further comprising: performing a residual operation on a result of each stage of edge fusion.

10. The method according to claim 1, wherein the mapping the second fusion image to obtain position vectors of feature points comprises:
    sequentially performing a residual operation and a full-connection operation on the second fusion image to obtain the position vectors of the feature points.

11. An electronic device, comprising:
    a processor; and
    a memory for storing instructions executable by the processor;
    wherein execution of the instructions by the processor causes the processor to perform:
    performing edge detection on a face image to obtain a face feature line image; and
    fusing the face image and the face feature line image to obtain position information of face feature points,
    wherein the processor is further configured to comprises:
    perform input image fusion on the face image to obtain a first fusion image;
    perform at least one stage of edge image fusion on the first fusion image and the face feature line image to obtain a second fusion image; and
    map the second fusion image to obtain position vectors of feature points, and take the position vectors as the position information of the face feature points.

12. The electronic device according to claim 11, wherein the processor is configured to:
    perform validity determination on the face feature line image to obtain an optimized face feature line image; and
    the processor is further configured to: fuse the face image and the optimized face feature line image to obtain the position information of the face feature points.

13. The electronic device according to claim 11, wherein the processor is further configured to:
    perform feature line feature extraction on the face image to obtain a feature line image; and
    optimize the feature line image to obtain the face feature line image.

14. The electronic device according to claim 13, wherein the processor is further configured to:
  sequentially perform a convolution operation, a residual operation, a downsampling operation, and a residual operation on the face image to obtain the feature line image.

15. The electronic device according to claim 13, wherein the processor is further configured to:
  optimize the feature line image by at least one stage of optimization network to obtain the face feature line image, wherein each stage of the optimization network comprises a hourglass-shaped network used for realizing a residual operation and an information transmission layer used for realizing feature line information transmission.

16. The electronic device according to claim 11, wherein the processor is configured to:
  perform optimization processing on the first fusion image to obtain an optimized first fusion image, wherein the optimization processing sequentially comprises a convolution operation, a downsampling operation, and a residual operation.

17. The electronic device according to claim 11, wherein the processor is further configured to:
  multiply the face image by each predefined feature line image pixel by pixel to obtain a plurality of boundary features having one-to-one correspondence to the each predefined feature line image; and
  superpose the plurality of boundary features and the face image to obtain the first fusion image.

18. A non-transitory computer-readable storage medium, having computer program instructions stored thereon, wherein execution of the instructions by the processor causes the processor to perform:
  performing edge detection on a face image to obtain a face feature line image; and
  fusing the face image and the face feature line image to obtain position information of face feature points,
  wherein the fusing the face image and the face feature line image to obtain position information of face feature points comprises:
  performing input image fusion on the face image to obtain a first fusion image;
  performing at least one stage of ed e image fusion on the first fusion image and the face feature line image to obtain a second fusion image; and
  mapping the second fusion image to obtain position vectors of feature points, and taking the position vectors as the position information of the face feature points.

* * * * *